United States Patent
Tissot

(10) Patent No.: US 10,254,837 B2
(45) Date of Patent: Apr. 9, 2019

(54) TACTILE CONTROL INTERFACE

(71) Applicant: DAV, Créteil (FR)

(72) Inventor: Jean-Marc Tissot, Creteil (FR)

(73) Assignee: DAV, Créteil (FR)

( * ) Notice: Subject to any disclaimer, the term of this patent is extended or adjusted under 35 U.S.C. 154(b) by 0 days.

(21) Appl. No.: 14/651,497

(22) PCT Filed: Nov. 19, 2013

(86) PCT No.: PCT/FR2013/000300
§ 371 (c)(1),
(2) Date: Jun. 11, 2015

(87) PCT Pub. No.: WO2014/091089
PCT Pub. Date: Jun. 19, 2014

(65) Prior Publication Data
US 2015/0309576 A1 Oct. 29, 2015

(30) Foreign Application Priority Data

Dec. 13, 2012 (FR) ...................... 12 03410

(51) Int. Cl.
*G06F 3/01* (2006.01)
*G06F 3/041* (2006.01)

(52) U.S. Cl.
CPC ............ *G06F 3/016* (2013.01); *G06F 3/0414* (2013.01); *G06F 3/0418* (2013.01)

(58) Field of Classification Search
CPC ...... G06F 3/016; G06F 3/0414; G06F 3/0418; G06F 2203/014; G06F 3/041
See application file for complete search history.

(56) References Cited

U.S. PATENT DOCUMENTS

| | | | | |
|---|---|---|---|---|
| 3,657,475 A * | 4/1972 | Peronneau | ............ | G06F 3/0414 177/199 |
| 4,745,565 A * | 5/1988 | Garwin | ................. | G06F 3/0414 178/18.02 |
| 5,714,694 A * | 2/1998 | Diessner | ................... | G01L 1/26 73/862.632 |
| 5,768,616 A * | 6/1998 | Teterwak | ................ | G06F 3/046 178/114 |
| 7,054,525 B1* | 5/2006 | Bugaud | ................. | G02F 1/2252 385/37 |

(Continued)

FOREIGN PATENT DOCUMENTS

EP 2 202 619 A1 6/2010

OTHER PUBLICATIONS

International Search Report issued in PCT/FR2013/000300 dated Jan. 28, 2014 (2 pages).

*Primary Examiner* — Sardis F Azongha
(74) *Attorney, Agent, or Firm* — Osha Liang LLP

(57) ABSTRACT

A tactile control interface including an outer surface and means for locating a pressure by a finger of a user on the outer surface is disclosed. The outer surface is implemented by a rigid plate and said locating means include at least three force sensors onto which the plate is attached and which are configured for measuring a force in a direction substantially normal to the plane of the plate, means for calculating the position of the pressure of a finger on the plate on the basis of the measurements supplied by said at least three force sensors.

18 Claims, 4 Drawing Sheets

(56) References Cited

U.S. PATENT DOCUMENTS

| | | | |
|---|---|---|---|
| 7,176,897 B2 * | 2/2007 | Roberts | G06F 3/0414 178/18.01 |
| 7,532,202 B2 * | 5/2009 | Roberts | G06F 3/0414 178/18.01 |
| 8,482,381 B2 * | 7/2013 | Chatterjee | G06F 3/016 340/5.52 |
| 8,564,559 B2 * | 10/2013 | Hou | G06F 1/1626 345/169 |
| 8,736,559 B2 * | 5/2014 | Pertuit | G06F 3/0418 345/173 |
| 9,164,605 B1 * | 10/2015 | Pirogov | G06F 3/041 |
| 9,644,984 B2 * | 5/2017 | Fliegner | G01C 21/3652 |
| 2003/0214485 A1 | 11/2003 | Roberts | |
| 2004/0125086 A1 * | 7/2004 | Hagermoser | G06F 3/0414 345/173 |
| 2006/0119589 A1 * | 6/2006 | Rosenberg | A63F 13/06 345/173 |
| 2007/0229475 A1 * | 10/2007 | Gettemy | G06F 1/1626 345/173 |
| 2010/0045624 A1 * | 2/2010 | Hisatsugu | B60H 1/00985 345/173 |
| 2010/0057235 A1 * | 3/2010 | Wang | G06F 1/1626 700/94 |
| 2010/0079391 A1 * | 4/2010 | Joung | G06F 3/03547 345/173 |
| 2010/0103640 A1 | 4/2010 | Brown et al. | |
| 2011/0187667 A1 * | 8/2011 | Kaida | G06F 3/0416 345/173 |
| 2011/0227872 A1 * | 9/2011 | Huska | G06F 3/016 345/174 |
| 2014/0028575 A1 * | 1/2014 | Parivar | G06F 3/0414 345/173 |
| 2014/0111448 A1 * | 4/2014 | Moses | G06F 1/1601 345/173 |

* cited by examiner

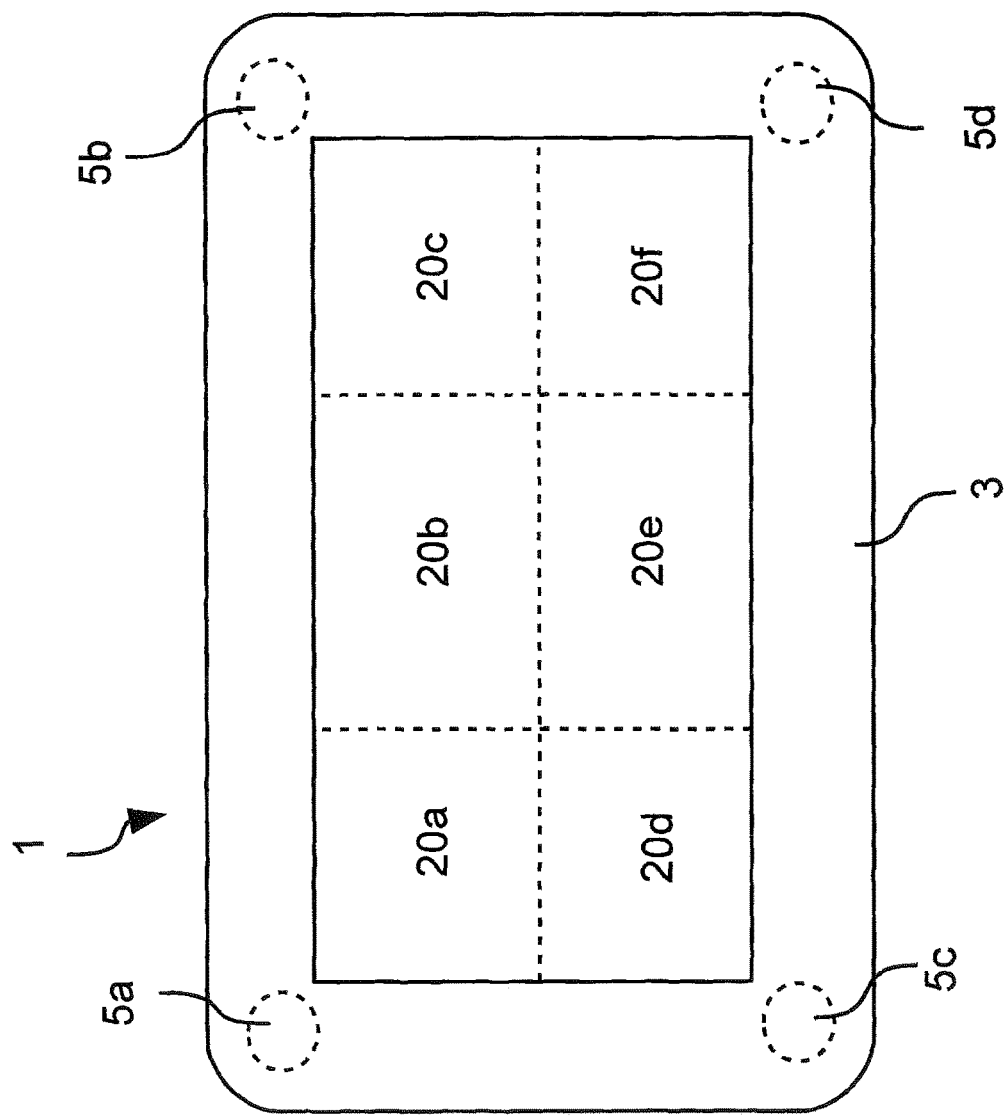

TACTILE CONTROL INTERFACE

The present invention relates to a tactile control interface intended notably to be installed in a motor vehicle.

In order to improve the ergonomics of motor vehicles and allow access to a multitude of functions without overloading the different control units (dashboard, steering-column control, central console, etc.), manufacturers increasingly use a tactile interface coupled to a display screen and allowing the user to access a plurality of functions or controls from a simple uniform interface which enables refined control units to be obtained. Furthermore, in order to be compatible with the automotive sector, an interface of this type must be reliable and have a limited cost.

In order to obtain an interface of this type, the present invention relates to a tactile control interface including an outer surface and means for locating a pressure by a finger of a user on the outer surface in which the outer surface is made from a rigid plate and in that said locating means include:

at least three force sensors onto which the plate is attached and which are configured for measuring a force in a direction substantially normal to the plane of the plate, means for calculating the position of the pressure of a finger on the plate on the basis of the measurements supplied by said at least three force sensors.

According to a different aspect of the present invention, the calculation means are configured to determine the position of the pressure of the finger on the plate through triangulation on the basis of the measurements supplied by said at least three force sensors.

According to an additional aspect of the present invention, the tactile control interface includes at least four force sensors, wherein the calculation means are configured to perform a plurality of locations through triangulation on the basis of three force sensors by using alternately the different combinations of three sensors from among the at least four force sensors.

According to a different aspect of the present invention, the calculation means are configured to estimate environmental parameters by using the measurements supplied by a force sensor not used for the triangulation.

According to an additional aspect of the present invention, the calculation means are configured to locate a pressure point by determining a barycenter of the measurements supplied by two force sensors successively for different pairs of force sensors.

According to a different aspect of the present invention, the force sensors are piezoelectric sensors.

According to an additional aspect of the present invention, the piezoelectric sensors are sensors mechanically amplified by a more or less elliptically shaped structure, the piezoelectric element being located along the major axis of the ellipse and the force measured been applied along the minor axis of the ellipse.

According to an additional aspect of the present invention, at least one of the force sensors is configured to transmit a haptic feedback to the user.

According to a different aspect of the present invention, the locating means are configured to determine the force of a pressure of a user.

According to an additional aspect of the present invention, the tactile interface also includes a display screen disposed facing the plate, said plate being transparent.

According to an additional aspect of the present invention, the calculation means include a microcontroller.

According to a different aspect of the present invention, the force sensors are distributed in such a way that the barycenter of the points situated facing the force sensors on the outer surface differs from the geometric center of said outer surface and the locating means are configured to take account of the position of the force sensors in order to determine the position of a pressure of a user.

Other characteristics and advantages of the invention will become evident from the description that will now be given, with reference to the attached drawings which, in an indicative but non-limiting manner, represent one possible embodiment.

In these drawings:

FIG. 5 shows a front view of the tactile interface with the display of the main menu.

Figure 2:
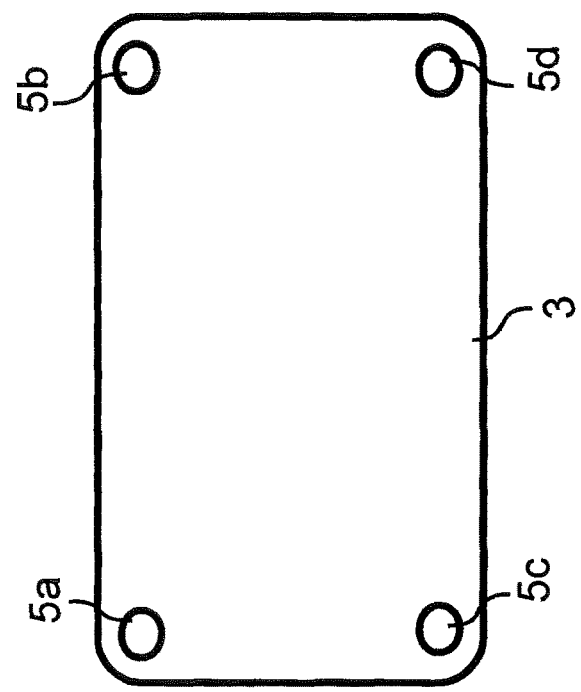
FIG. 2 shows a diagram of a tactile interface including four force sensors.

In these figures, the same reference numbers correspond to elements having the same function. Furthermore, for the references including a number and a letter, the number denotes a class of elements having the same function, whereas the letter denotes a particular element of the class, for example the element $5a$ is a particular element of the class of force sensors denoted by the reference 5.

The embodiments of the present invention relate to a tactile control interface 1 including an outer surface or tactile surface 2 on which the finger of the user presses to cause a control and means for locating the pressure. The outer surface 2 is made from a rigid plate 3. The locating means include force sensors 5 onto which the rigid plate 3 is attached. A rigid plate is understood to mean a plate having a negligible deformation in relation to the deformation of the force sensors 5 under the effect of a pressure on said plate, wherefore the pressure force of the finger of the user is transmitted entirely to the force sensors 5. The rigid plate 3 is, for example, made from polycarbonate or glass. Thus, by using at least three force sensors 5 of which the position in relation to the surface of the rigid plate 3 is known, the position of the pressure point on the plate 3 can be inferred from the force measurements supplied by the force sensors 5. This inference for passing from the measurements supplied by the sensors to the position of the pressure is implemented, for example, through triangulation. The location of the pressure points may be static or dynamic, i.e. a movement or sliding of the finger on the plate 3 is also determined.

Figure 1:
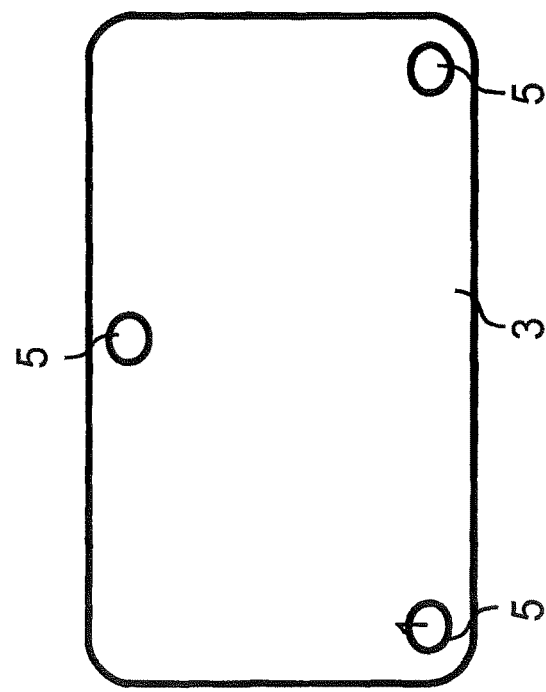
FIG. 1 shows a diagram of a tactile interface including three force sensors.

FIG. 1 shows one embodiment in which three force sensors 5 are used, disposed in a non-aligned manner on the periphery of the plate 3. The positioning of these sensors on the periphery enables a display screen to be associated with the tactile control interface, but if the tactile control does not include a display screen, the force sensors 5 can also be positioned more in the center of the rigid plate 3. The locating means 5 also include calculation means, such as, for example, a microcontroller, which enables the performance of the calculations necessary for the processing of the measurements supplied by the force sensors such as, for example, the calculations linked to the triangulation. The tactile control interface 1 generally has a rectangular shape, as shown in FIG. 1, but other shapes can also be used.

Figure 3:
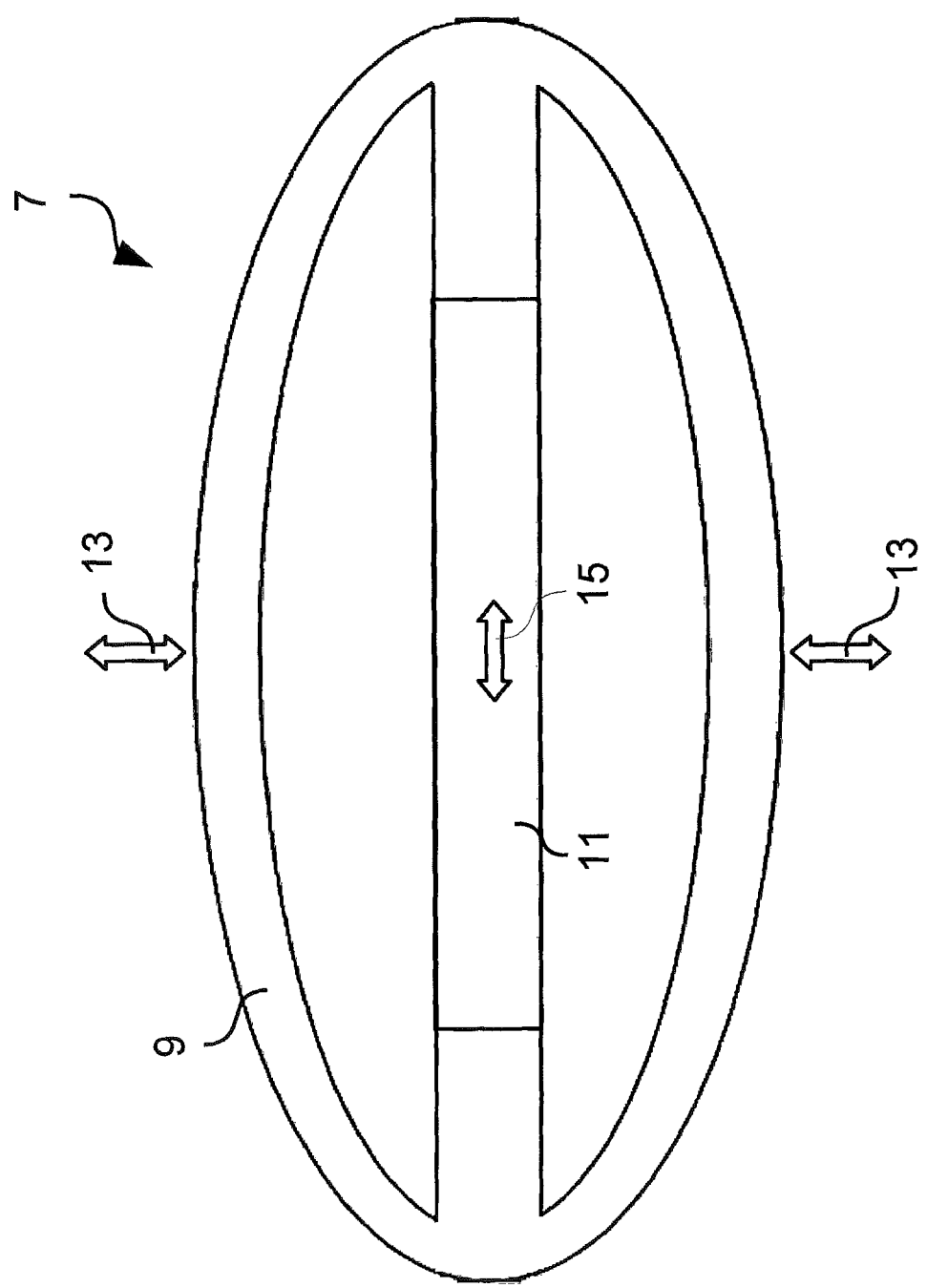
FIG. 3 shows a diagram of an amplified piezoelectric force sensor.

The force sensors 5 are configured to measure a force in a direction more or less normal to the plane of the plate 3 and are, for example, piezoelectric sensors. Amplified piezoelectric sensors can be used to improve the sensitivity of the tactile control interface 1. FIG. 3 shows a diagram of an amplified piezoelectric sensor 7 including a more or less elliptically shaped metal structure 9 including a major axis and a minor axis which are perpendicular in relation to one another. The piezoelectric element 11 is disposed along the major axis of the ellipse. The sensitive axis of the sensor 7, i.e. the axis along which the force is measured, corresponds to the minor axis of the ellipse. A weak force applied along the minor axis shown by the arrows 13 thus causes a defamation in the major axis shown by the arrow 15, thereby enabling improvement in the sensitivity of the sensor compared with a simple piezoelectric sensor.

According to a second embodiment, the tactile interface 1 includes four force sensors 5 disposed, for example, at the four corners of the plate 3 as shown in FIG. 2. The force sensors are denoted 5*a*, 5*b*, 5*c* and 5*d*. Three sensors are sufficient to carry out a determination of the pressure point through triangulation, but the use of four sensors allows not only the static location, but also the dynamic location, to be improved. To do this, a location is carried out, at a given time, through triangulation on the basis of the measurements supplied by three force sensors 5, for example the sensors 5*a*, 5*b* and 5*c*, then, for the location at the following time, the measurements supplied by the sensors 5*b*, 5*c* and 5*d* are used. Thus, the four possible combinations of three sensors are used alternately, thereby improving the quality of the location and compensating for any drift of a force sensor 5. Furthermore, the sensor that is not used for the triangulation can be used to carry out measurements of the environmental parameters which may adversely affect the location through triangulation, such as, for example, the presence of vibrations. It must be noted that a larger number of force sensors 5 can be used, thereby enabling further improvement in the quality of the location of the pressure.

Alternatively, the location of the pressure area can be determined by calculating the barycenter of the measurements supplied by two force sensors 5 by using at least two pairs of sensors disposed in a non-parallel manner. For example, a barycenter between the sensors 5*a* and 5*b* is determined which provides a first axis on which the pressure area is located, this axis is perpendicular to the straight line passing through the sensors 5*a* and 5*b* then, or simultaneously, between the sensors 5*b* and 5*c*, which provides a second axis on which the pressure area is located, the intersection between these two axes corresponding to the geographical situation of the pressure on the tactile surface 2. The calculation of the barycenter of other pairs of sensors enables improvement in the quality and reliability of the location of the support area by also integrating the lack of homogeneity which the plates 3 may evince.

Moreover, it must be noted that, for the different embodiments, the positioning of the force sensors 5 may correspond to a "homogeneous" distribution in which the barycenter of the points of the tactile surface 2 facing the force sensors 5 corresponds to the geometric center of the tactile surface 2, i.e. the barycenter of all points of the surface. For example, in the case of a rectangular surface with four sensors, the sensors will be placed at the center of the four sides or at the four corners and the geometric center will correspond to the intersection of the diagonals of the rectangle. The distribution may also be "non-homogeneous or inhomogeneous" in the case where the barycenter of the points of the tactile surface 2 facing the force sensors 5 will be different from the geometric center of the plate 3, for example to take account of the non-homogeneity of the structure of the plate 3 (different thicknesses or different materials of the plate 3), the presence of constraints in some areas of the plate (due, for example, to an attachment of the plate onto a structure of the control interface) or to improve sensitivity in some areas of the tactile surface 2. In fact, in some embodiments, only a part of the plate 3 can be used as the tactile control in such a way that the force sensors 5 are positioned in order to obtain an increased sensitivity in this area.

Moreover, the force sensors 5, notably in the case of piezoelectric sensors, can be used to supply a haptic feedback to the user to indicate to said user that the control has indeed been selected or validated. The haptic feedback consists in causing the rigid plate 3 to vibrate. For this purpose, one or more of the force sensors 5 is used to transmit a vibration wave to the rigid plate 3. In fact, in the case of piezoelectric sensors, the deformation of the sensor under the influence of a force creates a voltage, proportional to the deformation applied, at the output of the sensor. However, this piezoelectric effect can be inverted in such a way that the application of a voltage to the output of the piezoelectric sensor allows a deformation of the sensor which can create a vibration wave. The piezoelectric sensors are thus used not only to locate the pressure area, but also for the haptic feedback, thereby reducing the number of components required for the tactile interface 1. As previously, the position of the sensor(s) supplying a haptic feedback may be "non-homogeneous" in such a way as to increase the sensitivity of the haptic feedback in certain areas of the plate or to take account of the geometry or structure of the plate.

Moreover, as previously described, the measurement of the piezoelectric sensors is sensitive to the force generated by the pressure of the user's finger on the rigid plate 3. As well as the position of the pressure, the force of the pressure can therefore also be determined, for example by calculating the sum of the forces measured by the different force sensors in such a way that different controls can be envisaged according to the force of the pressure. Thus, the fact alone of touching an area of the outer plate will be able to select a function, and a greater pressure force of the user in this area will validate the choice of the selected function. A potentiometer effect can also be introduced, for example if the area corresponds to the sound volume control, a greater pressure force will result in an increase in the volume corresponding to a first dynamic effect.

A second dynamic effect corresponds to the determination of the movement or sliding of the pressure point on the tactile surface, this sliding being able to correspond to a particular control. The two dynamic effects (spatial with the sliding and temporal with the potentiometer function) can be paired to obtain an additional control or a double control.

The tactile interface 1 may also include a display screen 17 located behind and facing the rigid plate 3 in such a way as to display the different functions of the tactile interface. In this case, the rigid plate 3 will be transparent and the force sensors 5 will be placed on the periphery of the rigid outer plate 3 or the periphery of the screen 17 if the plate 3 is larger than the screen 17 in such a way as to permit the user to see the display screen. The display screen 17 is then placed as close as possible to the rigid plate 3 while avoiding the propagation of the vibration waves between the rigid plate 3 and the display screen.

Figure 4:
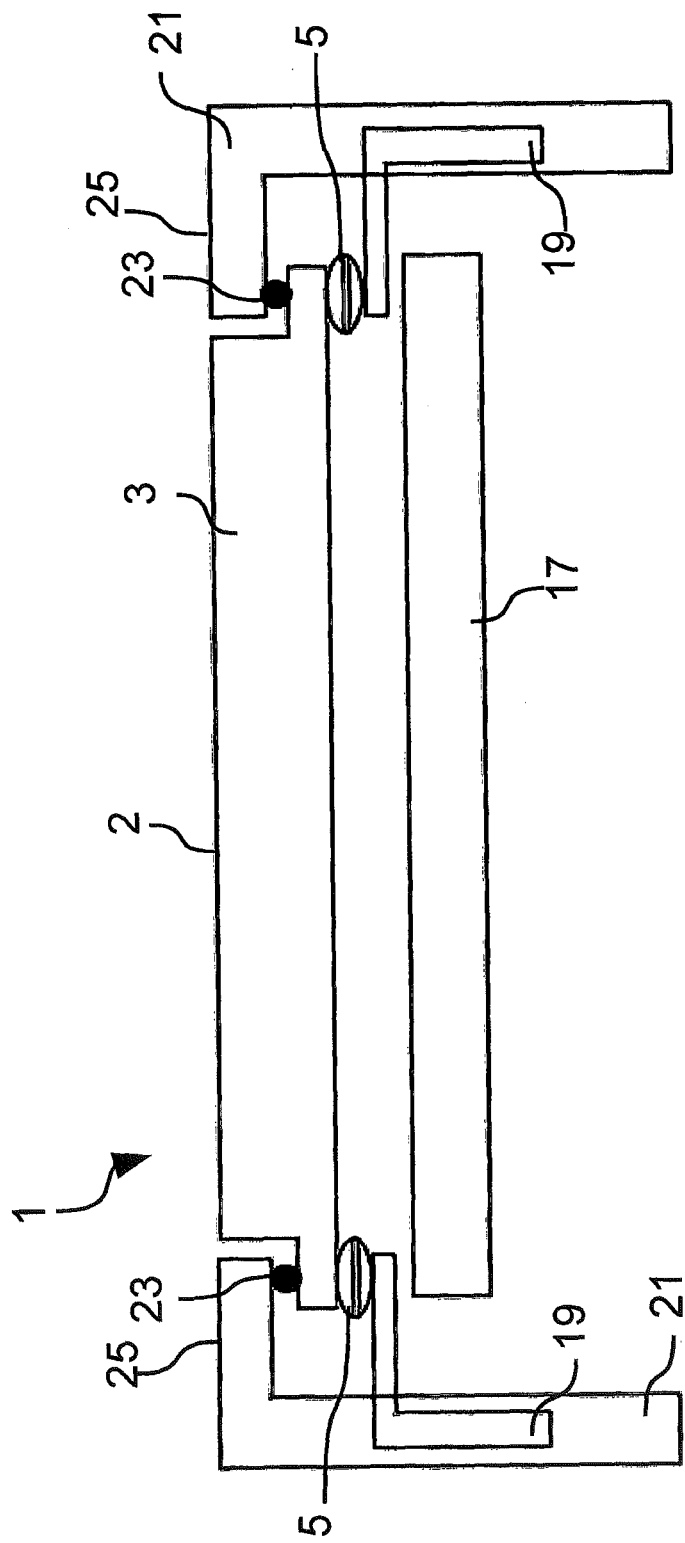
FIG. 4 shows a top view of a tactile interface according to one embodiment of the present invention.

FIG. 4 shows an example embodiment of a tactile interface 1 including a display screen 17, for example a TFT (Thin Film Transistor) screen, placed behind and facing the rigid plate 3. The rigid plate 3 is attached onto the force sensors 5 which are themselves attached onto supports 19, for example metal supports which may be lateral, vertical or diagonal in terms of the angles at which the force sensors 5 are located. The supports 19 are attached to the structure 21 of the tactile interface 1, for example by molding. The structure 21 is implemented, for example, in molded Zamak® in such a way that the structure 21 can be molded directly around the supports 19. The tactile interface 1 also includes a peripheral joint 23 located between the rigid outer plate 3 and the outer edges 25 of the structure 21 in such a way as to avoid the infiltration of dust between the transparent rigid plate 3 and the display screen 17.

In order to better understand the embodiments of the present invention, an example of use will now be described in detail in the case of a tactile interface 1 located in the central console of a motor vehicle. FIG. 5 shows the initial menu displayed when the motor vehicle sets off. The screen is divided into 6 parts 20*a*, 20*b*, 20*c*, 20*d*, 20*e* and 20*f*, corresponding to 6 different functions respectively: "audio", "air conditioning", "navigation", "telephone", "video" and "emergencies". To select a function, the user presses his finger on the screen part corresponding to the required function, for example the part 20*a* at the top left corresponding to the "audio" function. The pressure on this screen part is detected by the force sensors 5 by performing a triangulation on three sensors. In fact, the closer the pressure is located to a force sensor 5, the greater the detected force. Thus, in the case of a pressure on the part 20*a*, the greatest force will be measured by the sensor 5*a* and the weakest force by the sensor 5*d*. Furthermore, the reliability of the detection of the positioning of the pressure is improved by modifying the combination of three force sensors for the triangulation with each measurement. The force sensor 5 not used for the triangulation can be used to measure environmental parameters influencing the measurements of the force sensors 5. For example, vibrations may be caused by the road surface, or the tactile surface may be inhomogeneous in terms of vibration behavior, etc. These vibrations are measured by the fourth sensor and the measurements of the fourth sensor are used to compensate for the measurements of the other three sensors 5. Once the position of the pressure is detected, the function corresponding to the position of the pressure is determined by processing means such as, for example, a microcontroller. The rectangle corresponding to the selected function is then displayed in a different color and a vibration is emitted by one of the piezoelectric force sensors to supply a haptic feedback to the user. This vibration is implemented, for example, by the sensor not used for the triangulation. The selected function is then validated by a greater pressure of the user. According to a different embodiment, the validation can be effected through the withdrawal of the user's finger from the area of the surface concerned or by means of a dedicated validation area. In fact, the software for processing the data of the force sensors 5 can be configured to validate the control when the pressure force is greater than a predetermined threshold. The triggering of the validation can be implemented when the value measured by one of the force sensors exceeds the threshold or when the sum of the values measured by the force sensors exceeds the threshold. A haptic feedback can also be implemented at the time of the validation, either in addition to the haptic selection feedback, or instead of the haptic selection feedback. Thus, the validation of the "audio" function results in the opening of an "audio" menu where different parameters can be modified such as, for example, the volume, radio station or music track. Similarly, the user can then perform the different controls by pressing on the tactile control interface 1.

The use of a rigid plate mounted on force sensors thus provides a simple and reliable tactile interface that can easily be installed in a motor vehicle. Moreover, the use of amplified piezoelectric sensors provides a high sensitivity and allows a haptic feedback to be supplied without the need to include an additional actuator.

The invention claimed is:

1. A tactile control interface comprising:
an outer surface;
means for locating a pressure by a finger of a user on the outer surface; wherein the outer surface is implemented by a plate;
wherein said locating means include:
at least four force sensors onto which the plate is attached and which are configured to measure a force in a direction substantially normal to a plane of the plate, and
means for calculating a position of the pressure of the finger on the plate based on measurements supplied by at least three of the force sensors;
wherein the calculation means is configured to determine the position of the pressure of the finger on the plate through triangulation based on the measurements supplied by said at least three of the force sensors,
wherein the calculation means is configured to estimate environmental parameters using the measurements supplied by a force sensor that is not used for the triangulation,
wherein at least one of the force sensors is configured to transmit haptic feedback to the user,
and
wherein the calculation means is configured to calculate a plurality of locations through triangulation based on said at least three of the force sensors using, alternately, different combinations of three sensors from among the at least four force sensors; and
a display screen facing the plate, said plate being transparent, wherein said four force sensors are between the plate and the display screen, wherein the display screen is divided into a plurality of parts, wherein each part of the plurality of parts corresponding to a different function,
wherein the determined the position of the pressure of the finger is in one part of the plurality of parts such that the at least one of the force sensors provides the transmitted haptic feedback in said one part.

2. The tactile control interface as claimed in claim 1, wherein the calculation means is configured to locate a pressure point by determining a barycenter of the measurements supplied by two of the force sensors successively for different pairs of the force sensors.

3. The tactile control interface as claimed in claim 1, wherein the force sensors are piezoelectric sensors.

4. The tactile control interface as claimed in claim 3, wherein the piezoelectric sensors include a piezoelectric element that is mechanically amplified by an elliptically shaped structure, the piezoelectric element being located along the major axis of the elliptically shaped structure and the force being measured is applied along the minor axis of the elliptically shaped structure.

5. The tactile control interface as claimed in claim 1, wherein the locating means is configured to determine the force of the pressure of the user.

6. The tactile control interface as claimed in claim 1, wherein the calculation means includes a microcontroller.

7. The tactile control interface as claimed in claim 1, wherein the force sensors are distributed such that a barycenter of points facing the force sensors on the outer surface differs from a geometric center of said outer surface; and wherein the means for calculating is configured to account for position of the force sensors in order to determine the position of the pressure of the finger of the user.

8. The tactile control interface as claimed in claim 1, wherein the position of the pressure is a movement or sliding of the finger on the plate.

9. The tactile control interface as claimed in claim 1, wherein the display screen is behind the plate such that a gap is created between the display screen and the plate.

10. The tactile control interface as claimed in claim 1, wherein the plate is attached onto the four force sensors, and the four force sensors are attached onto supports.

11. The tactile control interface as claimed in claim 10, wherein the supports are attached to a structure of the tactile control interface.

12. The tactile control interface as claimed in claim 11, further comprising a peripheral joint located between the plate and outer edges of the structure such that a dust free zone is formed between the plate and the display screen.

13. The tactile control interface as claimed in claim 1, wherein the plurality of parts comprises six parts.

14. The tactile control interface as claimed in claim 13, wherein each of the six parts corresponding to the different function selected from one of audio, air conditioning, navigation, telephone, video and emergency functions.

15. The tactile control interface as claimed in claim 14, wherein the different function is then validated by a greater pressure applied by the user being greater than a predetermined threshold.

16. The tactile control interface as claimed in claim 1, wherein the at least one of the force sensors, providing the transmitted haptic feedback, is not used for the triangulation.

17. The tactile control interface as claimed in claim 1, wherein the at least four force sensors are each at a corner of the plate.

18. The tactile control interface as claimed in claim 1, wherein at least one of the force sensors is configured to transmit a vibration wave to the plate to provide the transmitted haptic feedback to the user.

* * * * *